US012709147B2

(12) United States Patent
Chung et al.

(10) Patent No.: US 12,709,147 B2
(45) Date of Patent: Aug. 18, 2026

(54) HYBRID POWER SYSTEM

(71) Applicant: APh ePower Co., Ltd., Kaohsiung City (TW)

(72) Inventors: Cheng-Ta Chung, Kaohsiung City (TW); Chien-Hsun Wu, Kaohsiung City (TW); Hsiu-Hsien Su, Kaohsiung City (TW); Shang-Zeng Huang, Kaohsiung City (TW)

(73) Assignee: APh ePower Co., Ltd., Kaohsiung City (TW)

( * ) Notice: Subject to any disclaimer, the term of this patent is extended or adjusted under 35 U.S.C. 154(b) by 0 days.

(21) Appl. No.: 19/243,698

(22) Filed: Jun. 20, 2025

(65) Prior Publication Data

US 2025/0388074 A1 Dec. 25, 2025

(30) Foreign Application Priority Data

Jun. 20, 2024 (TW) ................................ 113122856

(51) Int. Cl.
*B60K 6/365* (2007.10)
*B60K 6/26* (2007.10)
(Continued)

(52) U.S. Cl.
CPC ................ *B60K 6/365* (2013.01); *B60K 6/26* (2013.01); *B60K 6/28* (2013.01); *B60K 6/48* (2013.01); *B60Y 2200/12* (2013.01)

(58) Field of Classification Search
CPC ................ B60K 2007/003; B60K 1/02; B60K 6/36–365; B60K 6/20–547
See application file for complete search history.

(56) References Cited

U.S. PATENT DOCUMENTS 5,988,307 A 11/1999 Yamada et al.
9,216,641 B2 * 12/2015 Ono ...................... B60K 6/547
(Continued)

FOREIGN PATENT DOCUMENTS

JP 2017178000 10/2017
TW I673189 10/2019
WO 2013114594 8/2013

OTHER PUBLICATIONS

Cheng-Ta Chung et al., "Effects of Electric Circulation on the Energy Efficiency of the Power Split e-CVT Hybrid Systems", Energies, Sep. 5, 2018, pp. 1-15, vol. 11, Iss. 9.
(Continued)

*Primary Examiner* — Ernesto A Suarez
*Assistant Examiner* — Lillian T Nguyen
(74) *Attorney, Agent, or Firm* — JCIPRNET

(57) ABSTRACT

A hybrid power system, including an engine, a first motor, a power distributor, a second motor, an electrical energy controller, an energy storage module, a transmission mechanism, and a wheel, is provided. The first motor is connected to the engine. The power distributor is connected to the first motor. The second motor is connected to the power distributor. The electrical energy controller is coupled to the first motor and the second motor. The energy storage module is coupled to the electrical energy controller. The transmission mechanism is connected to the power distributor. The wheel is connected to the transmission mechanism. The engine is adapted to drive the first motor to rotate forward, and the second motor reversely rotates via the power distributor, while the engine drives the wheel through the power distributor and the transmission mechanism.

8 Claims, 8 Drawing Sheets

(51) Int. Cl.

| | |
|---|---|
| ***B60K 6/28*** | (2007.10) |
| ***B60K 6/48*** | (2007.10) |

(56) References Cited

U.S. PATENT DOCUMENTS

| | | | | |
|---|---|---|---|---|
| 2001/0016165 | A1* | 8/2001 | Shimabukuro | B60K 6/48 903/910 |
| 2009/0236160 | A1 | 9/2009 | Tanaka et al. | |
| 2017/0282896 | A1 | 10/2017 | Takizawa et al. | |
| 2017/0313302 | A1* | 11/2017 | Yagasaki | B60K 6/40 |
| 2018/0134142 | A1* | 5/2018 | Janson | B60K 6/365 |
| 2025/0033458 | A1* | 1/2025 | Chung | B60K 6/442 |

OTHER PUBLICATIONS

Cheng-Ta Chung et al., "Evaluation of driving performance and energy efficiency for a novel full hybrid system with dual-motor electric drive and integrated input- and output-split e-CVT", Energy, Jan. 15, 2020, pp. 1-14, vol. 191.

"Search Report of Europe counterpart Application", issued on Oct. 30, 2025, p. 1-p. 9.

"Notice of Reasons for Refusal of Japan Counterpart Application", issued on May 27, 2026, p. 1-p. 4.

* cited by examiner

HYBRID POWER SYSTEM

CROSS-REFERENCE TO RELATED APPLICATION

This application claims the priority benefit of Taiwan application serial no. 113122856, filed on Jun. 20, 2024. The entirety of the above-mentioned patent application is hereby incorporated by reference herein and made a part of this specification.

BACKGROUND

Technical Field

The disclosure relates to a power system, and in particular to a hybrid power system with various power modes.

Description of Related Art

With the improvement of environmental awareness, the consumer market has begun to pay attention to the environmental performance of cars. The booming electric vehicle industry of today is seen as an important way to implementing green travel. However, due to the limitations of battery technology development, existing electric vehicles still have insufficient cruising range and long battery charging time, which are still the biggest obstacles to the development of electric vehicles at this stage. Therefore, hybrid power vehicles are also developed. The reason is that hybrid power vehicles have longer range than electric vehicles and better environmental performance than fuel vehicles, and may serve as transitional products for electric vehicles before electric vehicles are fully popularized.

However, existing hybrid power vehicles have the characteristic of complex power systems. The reason is that a hybrid power system involves multiple transmission modules, such as a fuel engine, an electric motor, and a gearbox connecting the two. Energy loss occurs when power is transmitted between the transmission modules, causing poor transmission efficiency of the existing hybrid power system, which in turn increases fuel and electrical energy consumption. Therefore, improving the existing hybrid power system to improve energy conversion and transmission efficiency has become an important development goal.

SUMMARY

The disclosure provides a hybrid power system, which may be switched to a hybrid power mode or a pure electric mode according to different usage scenarios, so as to improve energy conversion and transmission efficiency.

A hybrid power system of the disclosure includes an engine, a first motor, a power distributor, a second motor, an electrical energy controller, an energy storage module, a transmission mechanism, and a wheel. The first the motor is connected to the engine. The power distributor is connected to the first motor. The second motor is connected to the power distributor. The electrical energy controller is coupled to the first motor and the second motor. The energy storage module is coupled to the electrical energy controller. The transmission mechanism connected to the power distributor. The wheel is connected to the transmission mechanism. The engine is adapted to drive the first motor to rotate forward, and the second motor reversely rotates via the power distributor, while the engine drives the wheel through the power distributor and the transmission mechanism. The energy storage module is adapted to synchronously start the first motor and the second motor through the electrical energy controller, and drive the wheel through the power distributor and the transmission mechanism.

In an embodiment of the disclosure, the power distributor includes a deceleration gear, a ring gear, a planetary gear set, and a sun gear. The deceleration gear is connected to the first motor, outer teeth of the ring gear mesh with the deceleration gear, the planetary gear set meshes with inner teeth of the ring gear, and the sun gear is connected to the second motor and meshes with the planetary gear set.

In an embodiment of the disclosure, a clutch disposed between the sun gear and the planetary gear set is further included.

In an embodiment of the disclosure, a first gear and a second gear are further included. The first gear is connected to the engine, the second gear is connected to the first motor and meshes with the first gear, and the engine is adapted to drive the second gear and the deceleration gear to rotate through the first gear.

In an embodiment of the disclosure, the transmission mechanism has a first transmission gear, a second transmission gear, a third transmission gear, a fourth transmission gear, and a chain. The first transmission gear is fixedly connected to the planetary gear set, the second transmission gear is adjacent to the first transmission gear, the third transmission gear is coaxially connected to the second transmission gear, the fourth transmission gear is coaxially connected to the wheel, the fourth transmission gear meshes with the third transmission gear, and the chain is sleeved on the first transmission gear and the second transmission gear.

In an embodiment of the disclosure, in a pure electric mode, the clutch locks the sun gear and the planetary gear set to form a rigid body, the energy storage module generates a first electrical energy to be provided to the first motor and the second motor through the electrical energy controller, the first motor generates a first mechanical energy and drives the ring gear to rotate through the deceleration gear, and the second motor generates a second mechanical energy and drives the sun gear and the planetary gear set to rotate.

In an embodiment of the disclosure, the first mechanical energy and the second mechanical energy are transmitted to the transmission mechanism through the power distributor, and the transmission mechanism drives the wheel to rotate.

In an embodiment of the disclosure, in a hybrid power mode, the clutch separates the sun gear and the planetary gear set, the engine generates a third mechanical energy, a part of the third mechanical energy drives the first motor to rotate forward to generate a second electrical energy, and another part of the third mechanical energy is transmitted to the transmission mechanism through the deceleration gear, the ring gear, and the planetary gear set, while the planetary gear set drives the sun gear, so that the second motor reversely rotates.

In an embodiment of the disclosure, the third mechanical energy is transmitted to the transmission mechanism through the power distributor, and the transmission mechanism drives the wheel to rotate.

In an embodiment of the disclosure, the electrical energy controller provides the second electrical energy to the second motor to drive the second motor to reversely rotate, so that the power distributor forms a differential rotation.

Based on the above, the hybrid power system of the disclosure is adapted to a motorcycle, a car, or other types of vehicles, and the hybrid power system combines power sources such as the engine, the first motor, the second motor, and the energy storage module. The disclosure can switch to the hybrid power mode or the pure electric mode according to different driving scenarios or terrains, and correspondingly turn on or off the engine, the first motor, the second motor, and the energy storage module to reduce energy consumption, so as to improve the driving range of the vehicle. In short, the hybrid power system switches between the hybrid power mode and the pure electric mode according to different situations to implement power usage in the optimal efficiency interval.

Furthermore, when switching between the hybrid power mode and the pure electric mode, the hybrid power system of the disclosure only needs to change the state (locked or unlocked) of the clutch to achieve the purpose of switching between the two modes. Compared with the existing hybrid power system configured with multiple sets of transmission components, the switching steps have been greatly simplified and the structure is simple. At the same time, there is no sense of jerking during the conversion process between different modes, which may also increase driving comfort and safety.

DESCRIPTION OF THE EMBODIMENTS

Figure 1A:
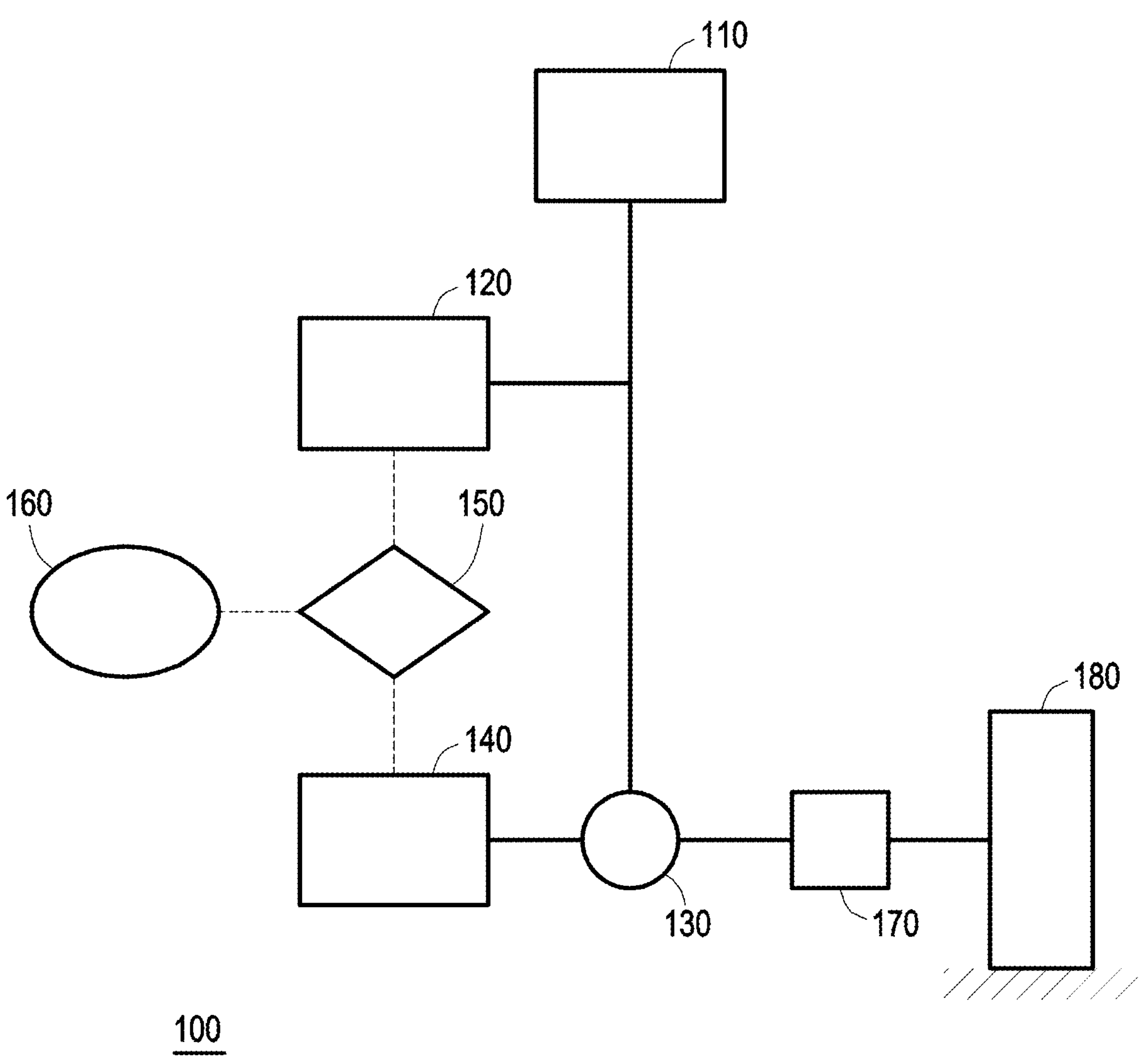
FIG. 1A is a block schematic diagram of a hybrid power system according to an embodiment of the disclosure.
Figure 1B:
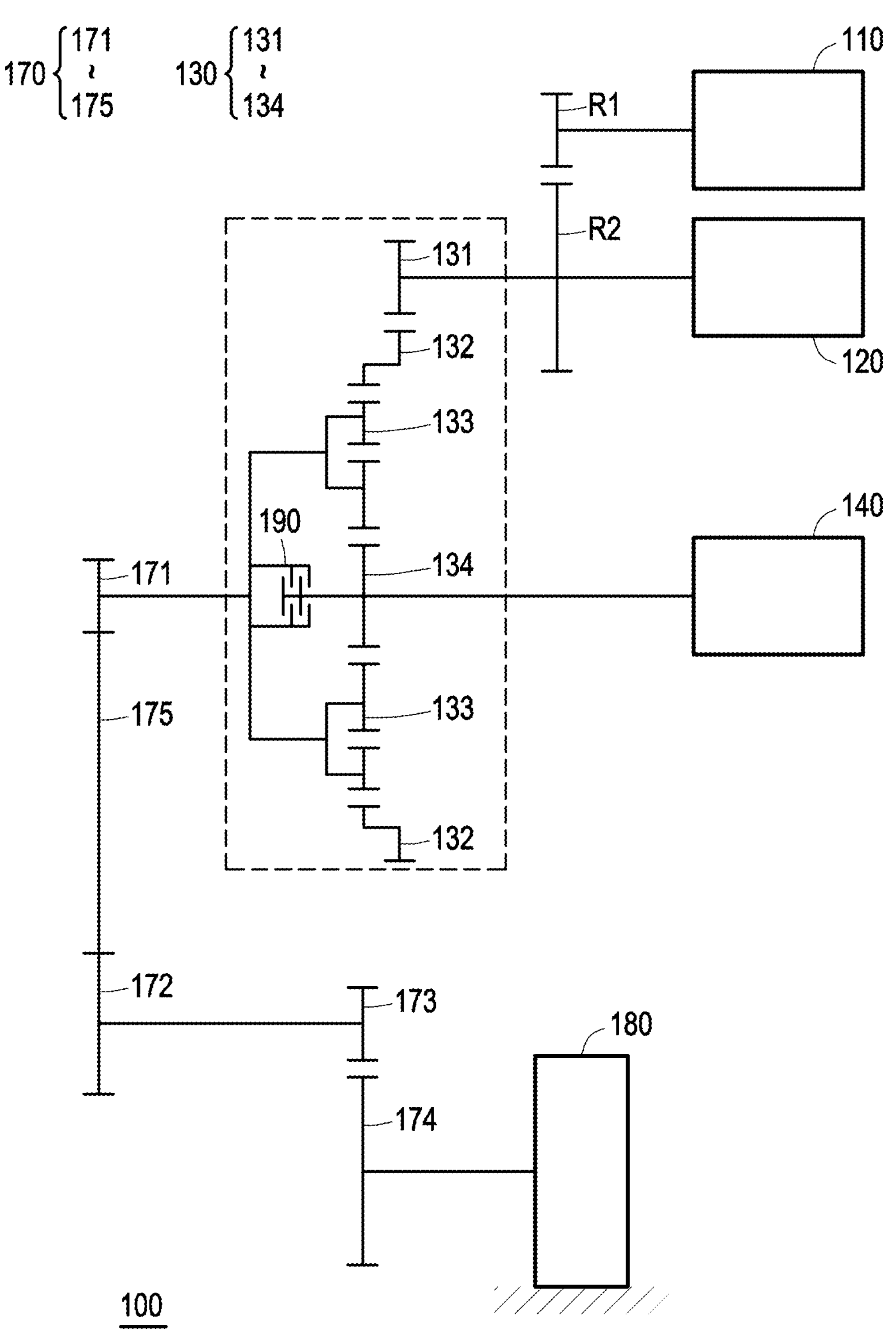
FIG. 1B is a schematic diagram of a structural connection of the hybrid power system of FIG. 1A.
Figure 1C:
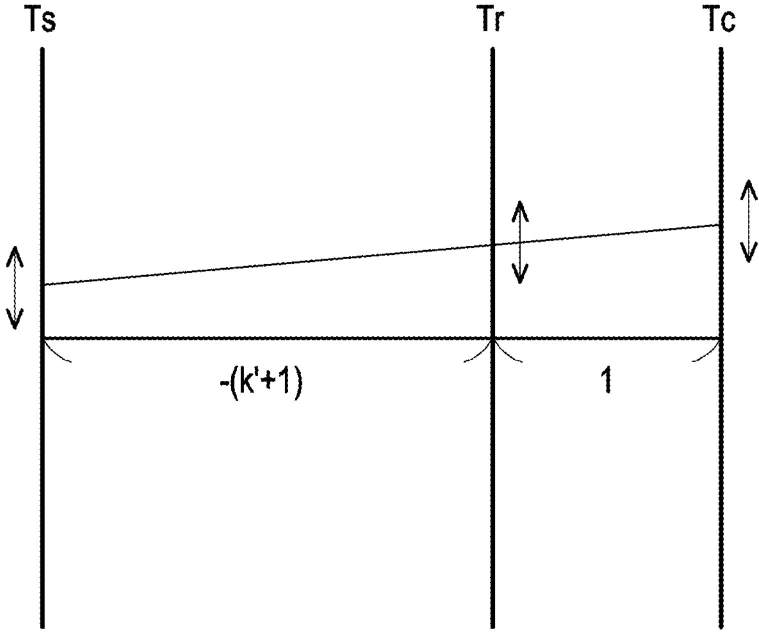
FIG. 1C is a rotational speed relationship diagram of an engine, a first motor, and a second motor of the hybrid power system of FIG. 1A.

FIG. 1A is a block schematic diagram of a hybrid power system according to an embodiment of the disclosure. FIG. 1B is a schematic diagram of a structural connection of the hybrid power system of FIG. 1A. FIG. 1C is a rotational speed relationship diagram of an engine, a first motor, and a second motor of the hybrid power system of FIG. 1A.

Referring to FIG. 1A to FIG. 1C, a hybrid power system 100 of the disclosure is adapted to a motorcycle, a car, or other types of vehicles and includes an engine 110, a first motor 120, a power distributor 130, a second motor 140, an electrical energy controller 150, an energy storage module 160, a transmission mechanism 170, and a wheel 180.

The engine 110 is disposed in a vehicle and adopts fuel as an energy source. The first motor 120 is connected to the engine 110. In addition, the engine 110 is connected in parallel to the first motor 120. When the engine 110 is operating, the first motor 120 is driven to switch to a generator mode to generate electrical energy. The power distributor 130 is connected to the first motor 120. The second motor 140 is connected to the power distributor 130. The electrical energy controller 150 is coupled to the first motor 120 and the second motor 140. The energy storage module 160 is coupled to the electrical energy controller 150, wherein the electrical energy of the energy storage module 160 is supplied to the first motor 120 and/or the second motor 140 by the electrical energy controller 150. The transmission mechanism 170 is connected to the power distributor 130 and the wheel 180 is connected to the transmission mechanism 170.

The power distributor 130 is adapted to transmit power generated by the engine 110, the first motor 120, and the second motor 140 to the transmission mechanism 170. Finally, the transmission mechanism 170 drives the wheel 180 to rotate.

Referring to FIG. 1A and FIG. 1B, the engine 110 is adapted to drive the first motor 120 to rotate forward, and the second motor 140 is driven by the power distributor 130 to reversely rotate. At the same time, the engine 110 drives the wheel 180 through the power distributor 130 and the transmission mechanism 170. The energy storage module 160 is adapted to synchronously start the first motor 120 and the second motor 140 through the electrical energy controller 150, and drive the wheel 180 through the power distributor 130 and the transmission mechanism 170.

Referring to FIG. 1B, the power distributor 130 has a deceleration gear 131, a ring gear 132, a planetary gear set 133, and a sun gear 134. The deceleration gear 131 is connected to the rotating shaft of the first motor 120, outer teeth of the ring gear 132 mesh with the deceleration gear 131, the planetary gear set 133 meshes with inner teeth of the ring gear 132, and the sun gear 134 is connected to the rotating shaft of the second motor 140 and meshes with the planetary gear set 133.

The hybrid power system 100 includes a first gear R1 and a second gear R2. The first gear R1 is connected to the rotating shaft of the engine 110, and the second gear R2 is connected to the rotating shaft of the first motor 120 and meshes with the first gear R1. Therefore, power generated by the rotation of the engine 110 may be transmitted to the second gear R2 through the first gear R1, that is, the engine 110 is adapted to drive the second gear R2 and the deceleration gear 131 to rotate through the first gear R1.

According to the above, the engine 110 and the first motor 120 mesh with the outer teeth of the ring gear 132 via the deceleration gear 131 to serve as a power input terminal, the first motor 120 meshes with the planetary gear set 133 via the sun gear 134, a power output terminal of the power distributor 130 is the planetary gear set 133, and the planetary gear set 133 transmits power to the wheel 180 via the transmission mechanism 170 with an appropriate reduction ratio, so that the wheel 180 rotates according to a corresponding rotational speed and has a corresponding torque to adapt to different scenarios.

Referring to FIG. 1A and FIG. 1B, the power of the engine 110, the first motor 120, and the second motor 140 are all transmitted to the wheel 180 through the power distributor 130 and the transmission mechanism 170. Since the engine 110, the first motor 120, and the second motor 140 share the same transmission mechanism 170, the hybrid power system 100 has a simple structure.

The transmission mechanism 170 has a first transmission gear 171, a second transmission gear 172, a third transmission gear 173, a fourth transmission gear 174, and a chain 175. The first transmission gear 171 is fixedly connected to the planetary gear set 133, the second transmission gear 172 is adjacent to the first transmission gear 171, the third transmission gear 173 is coaxially connected to the second transmission gear 172, the fourth transmission gear 174 is coaxially connected to the wheel 180, the fourth transmission gear 174 meshes with the third transmission gear 173, and the chain 175 is sleeved on the first transmission gear 171 and the second transmission gear 172.

In addition, power transmission paths of the engine 110, the first motor 120, and the second motor 140 are sequentially from the power distributor 130, the first transmission gear 171, the chain 175, the second transmission gear 172, the third transmission gear 173, the fourth transmission gear 174, and finally to the wheel 180.

The hybrid power system 100 includes a clutch 190 disposed between the sun gear 134 and the planetary gear set 133. When the clutch 190 is in an unlocked state, the sun gear 134 and the planetary gear set 133 are two independent components, that is, the sun gear 134 and the planetary gear set 133 are adapted to relatively rotate. When the clutch 190 is in a locked state, the sun gear 134 and the planetary gear set 133 are connected as a whole and synchronously rotate. Multiple power sources of the disclosure change the operating state of the power distributor 130 through the switching of the clutch 190, so switching steps of the hybrid power system 100 in different usage modes may be simplified.

Referring to FIG. 1C, a torque relationship of the hybrid power system 100 is expressed by the following equation:

$$\frac{T_s}{1} = \frac{T_r}{k'} = \frac{T_c}{-(k'+1)},$$

where $T_s$, $T_r$, and $T_c$ are respectively output torques of the sun gear 134, the ring gear 132, and the planetary gear set 133, and the parameter k' is defined as the following equation:

$$k' = -\frac{z_r}{z_s},$$

where $Z_r$ and $Z_s$ are respectively the number of teeth of the ring gear 132 and the sun gear 134.

A rotational speed relationship of the hybrid power system 100 is expressed by the following equation: $\omega_s + k'\omega_r - (k'+1)\omega_c = 0$, where $\omega_s$, $\omega_r$, and $\omega_c$ are respectively rotational speeds of the sun gear 134, the ring gear 132, and the planetary gear set 133. Since $k'<0$ and $-(k'+1)>0$, $T_s$ and $T_c$ have the same sign. Therefore, the ring gear 132 is connected to the engine 110 and serves as the power input terminal, and the sun gear 134 and the planetary gear set 133 serve as a power load terminal or the power output terminal.

According to the connection manner of the hybrid power system of FIG. 1B, the hybrid power system 100 of the disclosure has a pure electric mode and a hybrid power mode, and the operating conditions and the rotational speed relationship and the torque relationship thereof will be respectively described below. The main parameters are as follows: $r_e$ is a reduction ratio of the first gear R1 of the engine 110 to the second gear R2 of the first motor 120, that is $\omega_e/\omega_{mg1}$; $r_g$ is a reduction ratio of an output terminal (the deceleration gear 131) of the first motor 120 to the outer teeth of the ring gear 132, k' is a ratio of the inner teeth of the ring gear 132 to outer teeth of the sun gear 134, $r_{ch}$ is a reduction ratio of the planetary gear set 133 transmitted to the second transmission gear 172 via the chain 175, and $r_f$ is a final transmission reduction ratio of the third transmission gear 173 to the fourth transmission gear 174.

Figure 2A:
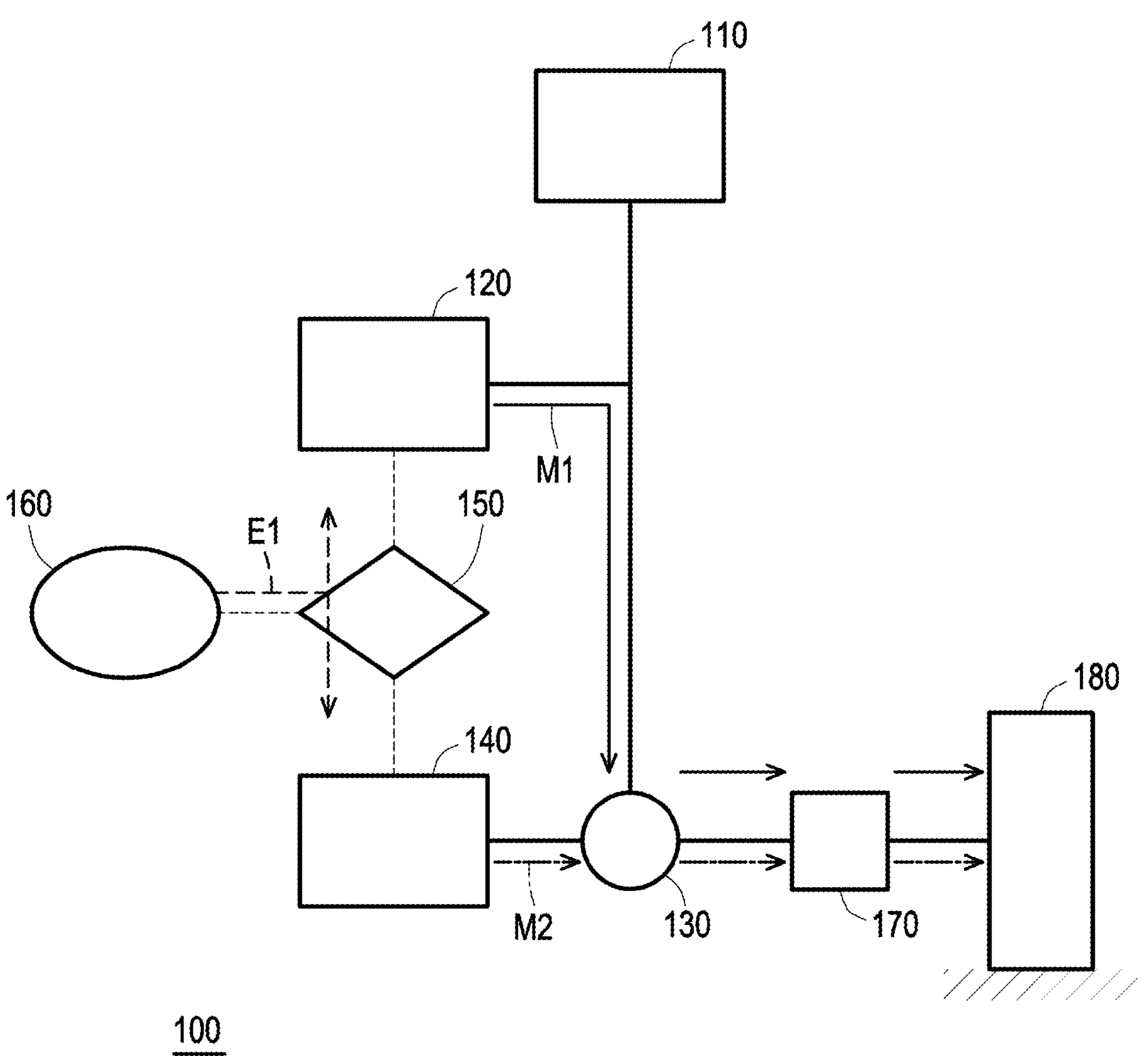
FIG. 2A is a block schematic diagram of power transmission of the hybrid power system of FIG. 1A and FIG. 1B in a pure electric mode.
Figure 2B:
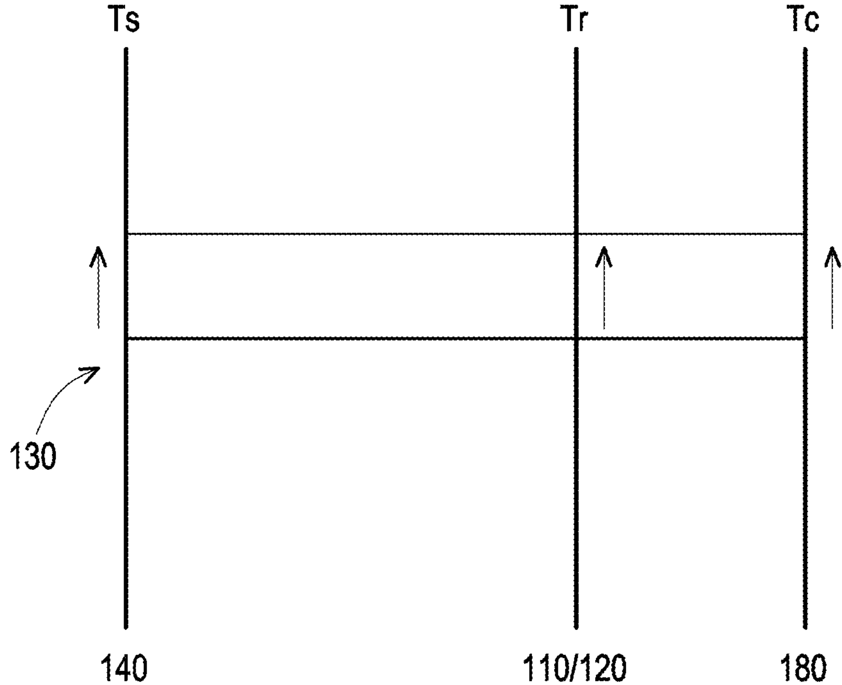
FIG. 2B is a rotational speed relationship diagram of the engine, the first motor, and the second motor of FIG. 2A.
Figure 3A:
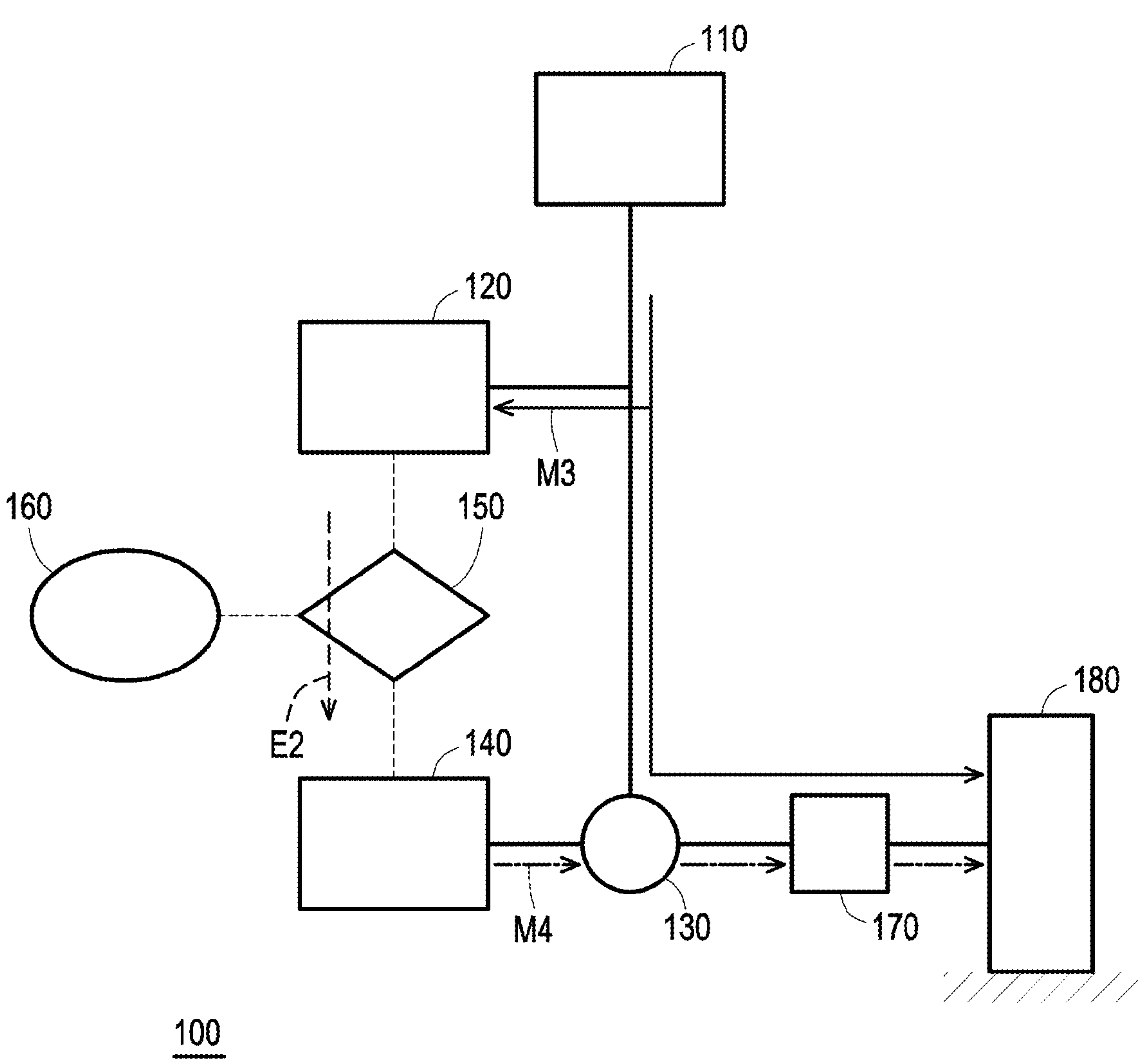
FIG. 3A is a block schematic diagram of power transmission of the hybrid power system of FIG. 1A and FIG. 1B in a hybrid power mode.
Figure 3B:
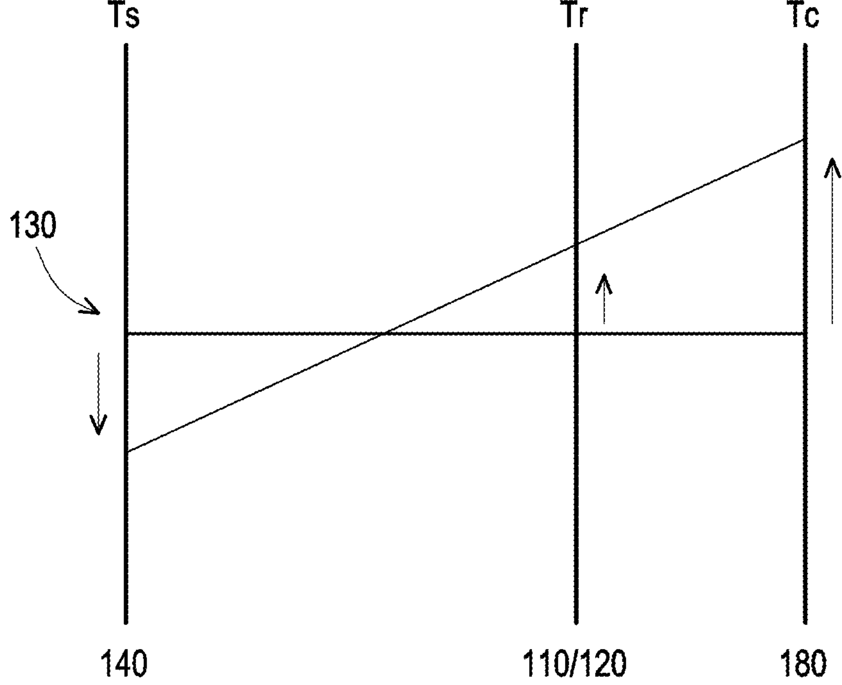
FIG. 3B is a rotational speed relationship diagram of the engine, the first motor, and the second motor of FIG. 3A.
Figure 4:
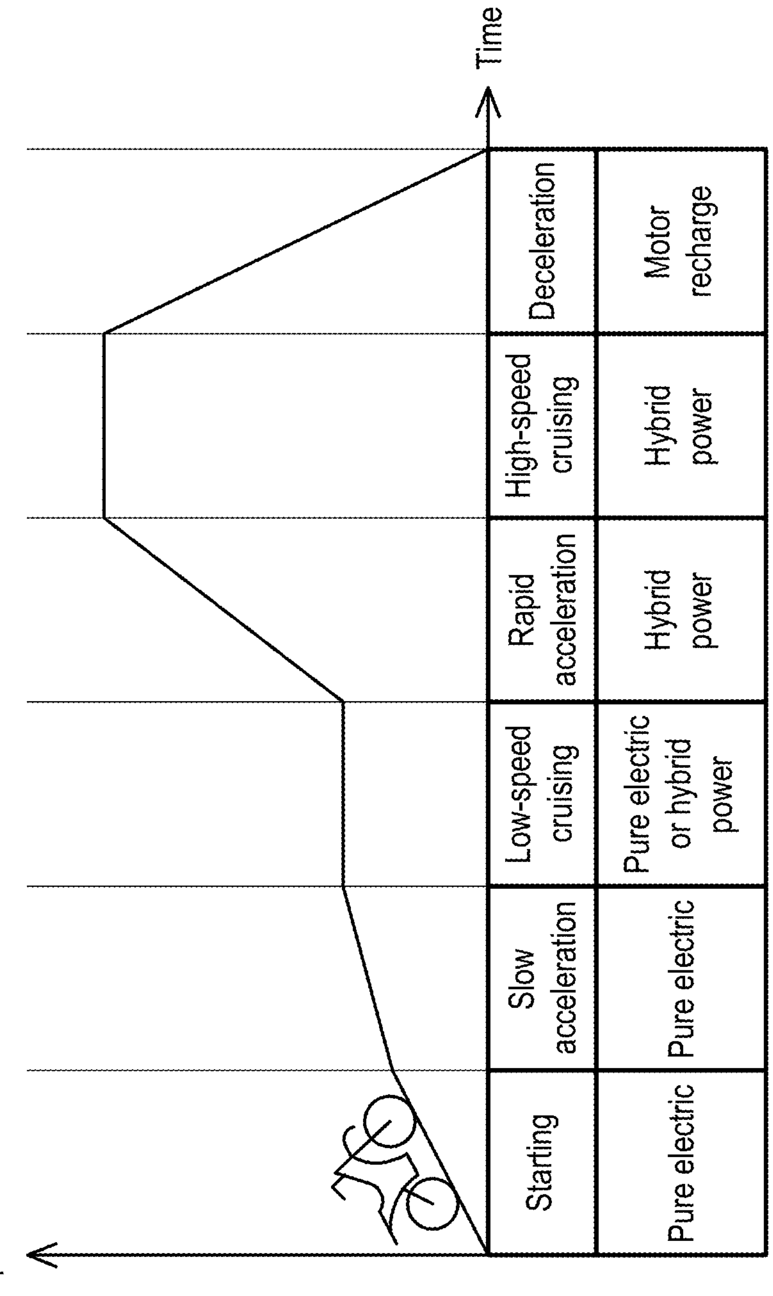
FIG. 4 is a schematic diagram of a mode switching rule of the hybrid power system of FIG. 1.

FIG. 2A is a block schematic diagram of power transmission of the hybrid power system of FIG. 1A and FIG. 1B in a pure electric mode. FIG. 2B is a rotational speed relationship diagram of the engine, the first motor, and the second motor of FIG. 2A. FIG. 3A is a block schematic diagram of power transmission of the hybrid power system of FIG. 1A and FIG. 1B in a hybrid power mode. FIG. 3B is a rotational speed relationship diagram of the engine, the first motor, and the second motor of FIG. 3A. FIG. 4 is a schematic diagram of a mode switching rule of the hybrid power system of FIG. 1.

Referring to FIG. 2A and FIG. 3A, in brief, the hybrid power system of the disclosure has an enhanced architecture in two modes: the pure electric mode (driven by the first motor 120 and the second motor 140) and the hybrid power mode (the engine 110, the first motor 120, and the second motor 140). The pure electric mode and the hybrid power mode will be respectively described in detail below.

Referring to FIG. 1B and FIG. 2A, for the hybrid power system 100 in the pure electric mode, the engine 110 is not started, the clutch 190 locks the sun gear 134 and the planetary gear set 133 to form a rigid body, the energy storage module 160 generates a first electrical energy E1 to be provided to the first motor 120 and the second motor 140 through the electrical energy controller 150. Then, the first motor 120 generates a first mechanical energy M1 and drives the outer teeth of the ring gear 132 to rotate through the deceleration gear 131. Then, the inner teeth of the ring gear 132 drive the planetary gear set 133 to rotate, so as to transmit the first mechanical energy M1 to the transmission mechanism 170. At the same time, the second motor 140 generates a second mechanical energy M2 and drives the sun gear 134 and the planetary gear set 133 to rotate, so as to transmit the second mechanical energy M2 to the transmission mechanism 170.

Therefore, in the pure electric mode, the first mechanical energy M1 and the second mechanical energy M2 are transmitted to the transmission mechanism 170 through the power distributor 130, and the transmission mechanism 170 drives the wheel 180 to rotate.

Referring to FIG. 2B, the torque relationship between the wheel 180, the first motor 120, and the second motor 140 is as follows: $T_w = r_{ch} r_f (T_{mg1} r_g + T_{mg2})$. The rotational speed relationship between the wheel 180, the first motor 120, and the second motor 140 is as follows: $\omega_{mg1} = r_g r_{ch} r_f \omega_w$, $\omega_{mg2} = r_{ch} r_f \omega_w$.

Referring to FIG. 4 together, the pure electric mode is adapted to scenarios when the vehicle is starting and accelerating and driving at medium or low speeds and may prevent the engine 110 from consuming fuel starting from a stationary state. The reason is that the fuel consumption from the stationary state to the medium or low speeds is relatively high. In addition, in the pure electric mode, the first motor 120 and the second motor 140 provide power at the same time, giving the vehicle excellent acceleration and climbing characteristics when starting at the low speed.

Referring to FIG. 1B and FIG. 3A, in the hybrid power mode, the clutch 190 separates the sun gear 134 and the planetary gear set 133, the engine 110 generates a third mechanical energy M3, a part of the third mechanical energy M3 drives the first motor 120 to rotate forward to generate a second electrical energy E2, and another part of the third mechanical energy M3 is transmitted to the transmission mechanism 170 through the deceleration gear 131, the ring gear 132, and the planetary gear set 133. At the same time, the planetary gear set 133 drives the sun gear 134 to reversely rotate the second motor 140.

Referring to FIG. 3A, in the hybrid power mode, the third mechanical energy M3 is transmitted to the transmission mechanism 170 through the power distributor 130, and the transmission mechanism 170 drives the wheel 180 to rotate.

In detail, when the clutch 190 is in the unlocked state, the sun gear 134 connected to the second motor 140 is disengaged from the clutch 190 and is reversed relative to the planetary gear set 133, so as to form an operating mode of output-split electronic continuously variable transmission (E-CVT) in which the rotational speed of the engine 110 is regulated by changing the rotational speed of the second motor 140. The so-called E-CVT refers to the use of a motor (generator) to control an engine operating point to achieve a continuously variable reduction ratio (continuously variable transmission) between the engine and the wheel.

In short, in the hybrid power mode, the engine 110 starts to output a driving torque, the second motor 140 changes a torque direction, causing the clutch 190 between the sun gear 134 and the planetary gear set 133 to be unlocked, the second motor 140 is driven by the planetary gear set 133, and the electrical energy controller 150 provides the second electrical energy E2 to the second motor 140, driving the second motor 140 to reversely rotate to form a fourth mechanical energy M4, so that the power distributor 130 forms a differential rotation. Referring to FIG. 3B together, at this time, the torque and rotational speed relationships between the engine 110, the first motor 120, and the second motor 140 are as follows:

$$\frac{T_{mg2}}{-1} = \frac{r_e r_g T_e - r_g T_{mg1}}{k'} = \frac{T_w/(r_{ch} r_f)}{-(k'+1)}$$

$$\omega_{mg2} + k' \frac{\omega_e}{r_e r_g} - r_{ch} r_f (k'+1)\omega_w = 0,\ \omega_{mg1} = r_e \omega_e$$

Referring to FIG. 4 together, the hybrid power mode is adapted to low-speed cruising, rapid acceleration, and high-speed cruising. In the hybrid power mode, the rotational speed and the operating point of the engine 110 are adjusted through the reversing function of the second motor 140 to achieve energy saving and speed change functions. Furthermore, in the hybrid power mode, the first motor 120 generates the second electrical energy E2 in the generator mode to be supplied to the second motor 140 to reverse the second motor 140, so as to form the fourth mechanical energy M4, thereby forming a load to continuously change the rotational speed of the engine 110 and the torque of the wheel 180.

In summary, the hybrid power system of the disclosure is adapted to the motorcycle, the car, or other types of vehicles, and the hybrid power system combines the power sources such as the engine, the first motor, the second motor, and the energy storage module. The disclosure can switch to the hybrid power mode or the pure electric mode according to different driving scenarios or terrains, and correspondingly turn on or off the engine, the first motor, the second motor, and the energy storage module to reduce energy consumption, so as to improve the driving range of the vehicle. In short, the hybrid power system switches between the hybrid power mode and the pure electric mode according to different situations to implement power usage in the optimal efficiency interval.

Furthermore, when switching between the hybrid power mode and the pure electric mode, the hybrid power system of the disclosure only needs to change the state (locked or unlocked) of the clutch to achieve the purpose of switching between the two modes. Compared with the existing hybrid power system configured with multiple sets of transmission components, the switching steps have been greatly simplified and the structure is simple. At the same time, there is no sense of jerking during the conversion process between different modes, which may also increase driving comfort and safety.

What is claimed is:

1. A hybrid power system, comprising:

an engine;

a first motor, connected to the engine;

a power distributor, connected to the first motor;

a second motor, connected to the power distributor;

an electrical energy controller, coupled to the first motor and the second motor;

an energy storage module, coupled to the electrical energy controller;

a transmission mechanism, connected to the power distributor; and a wheel, connected to the transmission mechanism, wherein the engine is adapted to drive the first motor to rotate forward, and the second motor reversely rotates via the power distributor, while the engine drives the wheel via the power distributor and the transmission mechanism, wherein the energy storage module is adapted to synchronously start the first motor and the second motor through the electrical energy controller, and drive the wheel through the power distributor and the transmission mechanism, wherein the power distributor has a deceleration gear, a ring gear, a planetary gear set, and a sun gear, wherein the deceleration gear is connected to the first motor, outer teeth of the ring gear mesh with the deceleration gear, the planetary gear set meshes with inner teeth of the ring gear, and the sun gear is connected to the second motor and meshes with the planetary gear set, wherein the hybrid power system further comprising a clutch disposed between the sun gear and the planetary gear set.

2. The hybrid power system according to claim 1, further comprising a first gear and a second gear, wherein the first gear is connected to the engine, the second gear is connected to the first motor and meshes with the first gear, and the engine is adapted to drive the second gear and the deceleration gear to rotate through the first gear.

3. The hybrid power system according to claim 1, wherein the transmission mechanism comprises a first transmission gear, a second transmission gear, a third transmission gear, a fourth transmission gear, and a chain, wherein the first transmission gear is fixedly connected to the planetary gear set, the second transmission gear is adjacent to the first transmission gear, the third transmission gear is coaxially connected to the second transmission gear, the fourth transmission gear is coaxially connected to the wheel, the fourth transmission gear meshes with the third transmission gear, and the chain is sleeved on the first transmission gear and the second transmission gear.

4. The hybrid power system according to claim 1, wherein in a pure electric mode, the clutch locks the sun gear and the planetary gear set to form a rigid body, the energy storage module generates a first electrical energy to be provided to the first motor and the second motor through the electrical energy controller, the first motor generates a first mechanical energy and drives the ring gear to rotate through the deceleration gear, and the second motor generates a second mechanical energy and drives the sun gear and the planetary gear set to rotate.

5. The hybrid power system according to claim 4, wherein the first mechanical energy and the second mechanical energy are transmitted to the transmission mechanism through the power distributor, and the transmission mechanism drives the wheel to rotate.

6. The hybrid power system according to claim 1, wherein in a hybrid power mode, the clutch separates the sun gear and the planetary gear set, the engine generates a third mechanical energy, a part of the third mechanical energy drives the first motor to rotate forward to generate a second electrical energy, and another part of the third mechanical energy is transmitted to the transmission mechanism through the deceleration gear, the ring gear, and the planetary gear set, while the planetary gear set drives the sun gear, so that the second motor reversely rotates.

7. The hybrid power system according to claim 6, wherein the third mechanical energy is transmitted to the transmission mechanism through the power distributor, and the transmission mechanism drives the wheel to rotate.

8. The hybrid power system according to claim 6, wherein the electrical energy controller provides the second electrical energy to the second motor to drive the second motor to reversely rotate to form a fourth mechanical energy, so that the power distributor forms a differential rotation.

* * * * *